April 10, 1945.  W. F. BOLDT  2,373,450
BRAKING SYSTEM
Filed June 27, 1942   4 Sheets-Sheet 2

INVENTOR
W. F. BOLDT
BY
ATTORNEY

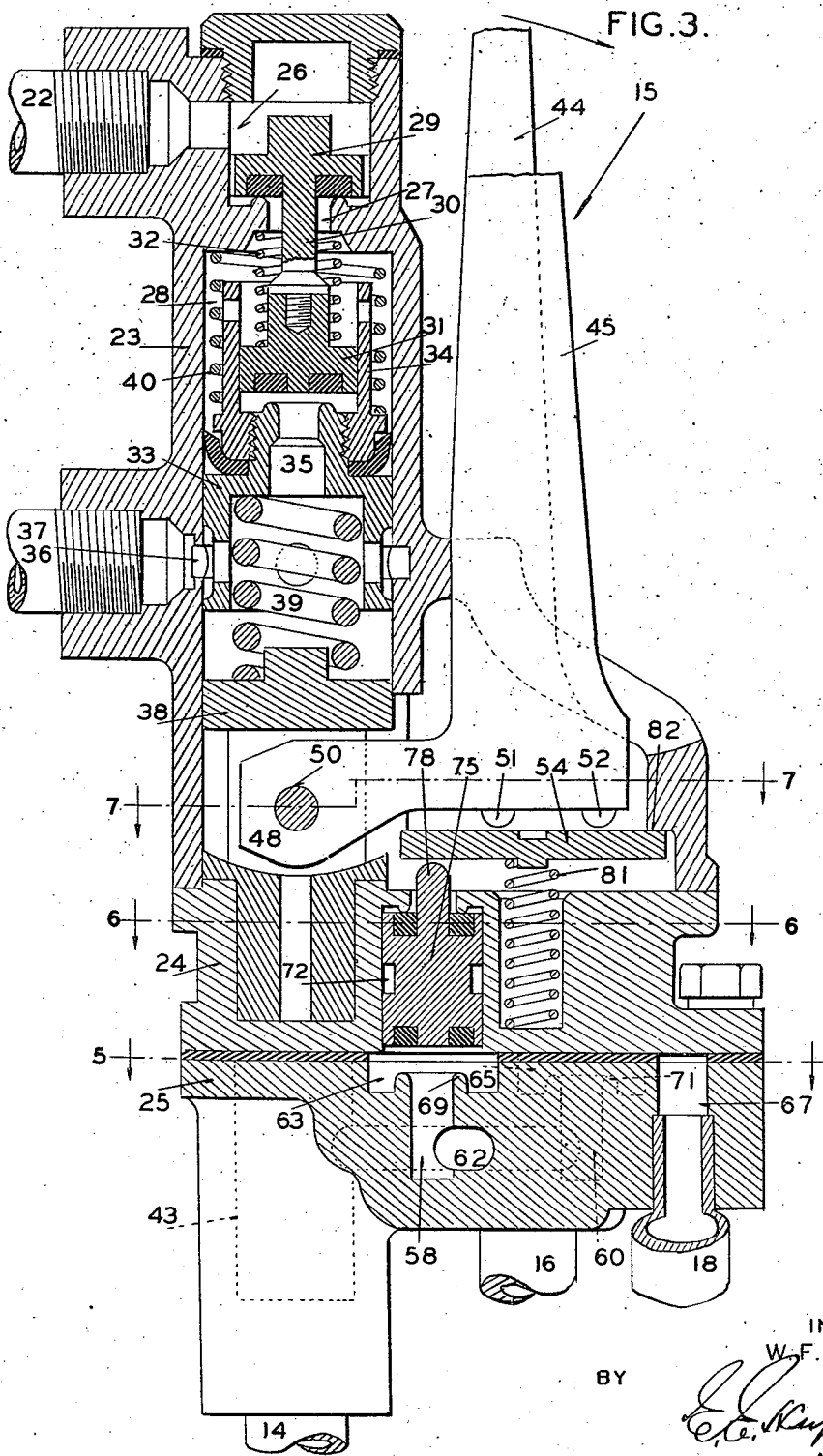

April 10, 1945. W. F. BOLDT 2,373,450
BRAKING SYSTEM
Filed June 27, 1942 4 Sheets-Sheet 4
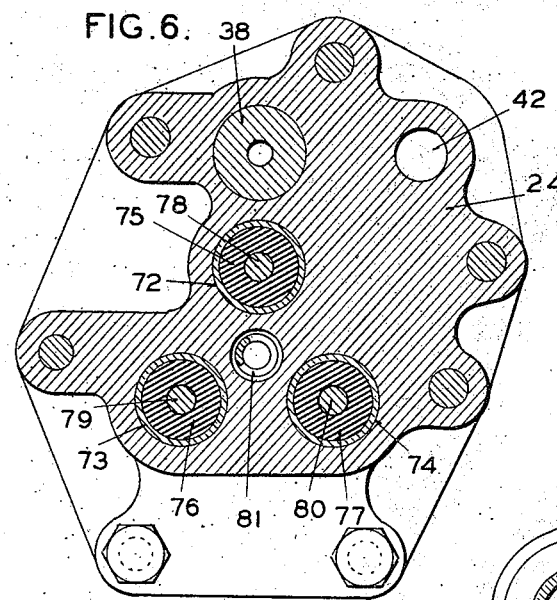
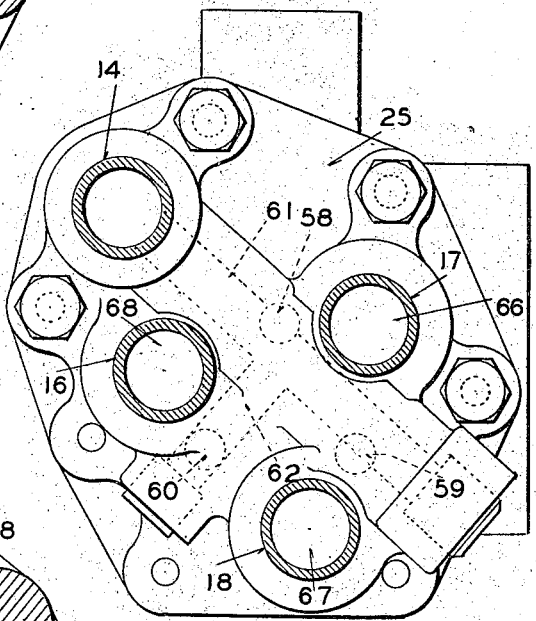
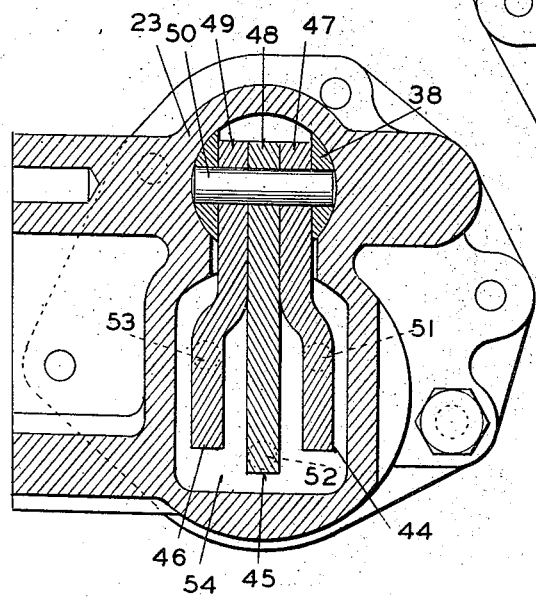
INVENTOR
W.F. BOLDT
BY
ATTORNEY Patented Apr. 10, 1945

2,373,450

UNITED STATES PATENT OFFICE 2,373,450

BRAKING SYSTEM

Werner F. Boldt, Clayton, Mo., assignor to Wagner Electric Corporation, St. Louis, Mo., a corporation of Delaware Application June 27, 1942, Serial No. 448,764

12 Claims. (Cl. 137—144)

My invention relates to a fluid pressure actuating system and more particularly to one for use in actuating a plurality of brakes.

One of the objects of my invention is to provide an improved fluid pressure actuating system for a plurality of brakes whereby all the brakes can be actuated by the operation of one control valve means and certain selected brakes can be actuated by the operation of another control valve means only.

Another object of my invention is to provide in a fluid pressure brake actuating means for a plurality of brakes, a foot-controlled valve for causing all the brakes to be actuated and hand-controlled valve means for selectively causing only certain brakes to be actuated.

Another object of my invention is to produce an improved valve means which can be incorporated in a fluid pressure brake actuating system in order to permit only certain selected brakes to be actuated.

Yet another object of my invention is to produce an improved valve means for incorporation in a fluid pressure brake actuating system which is so constructed and operated by different control levers that a single control valve can be actuated by all the levers and also the desired shutoff valves so that only selected brakes will be applied.

Still another and more general object of my invention is to provide an improved fluid pressure actuating system for a tractor vehicle and a trailer vehicle which will, by operation of one control means, cause the application of the brakes on both vehicles or by selective operation of another control means cause either the right or left side brakes of the tractor to be applied as desired or only the trailer brakes to be applied.

Figure 1:
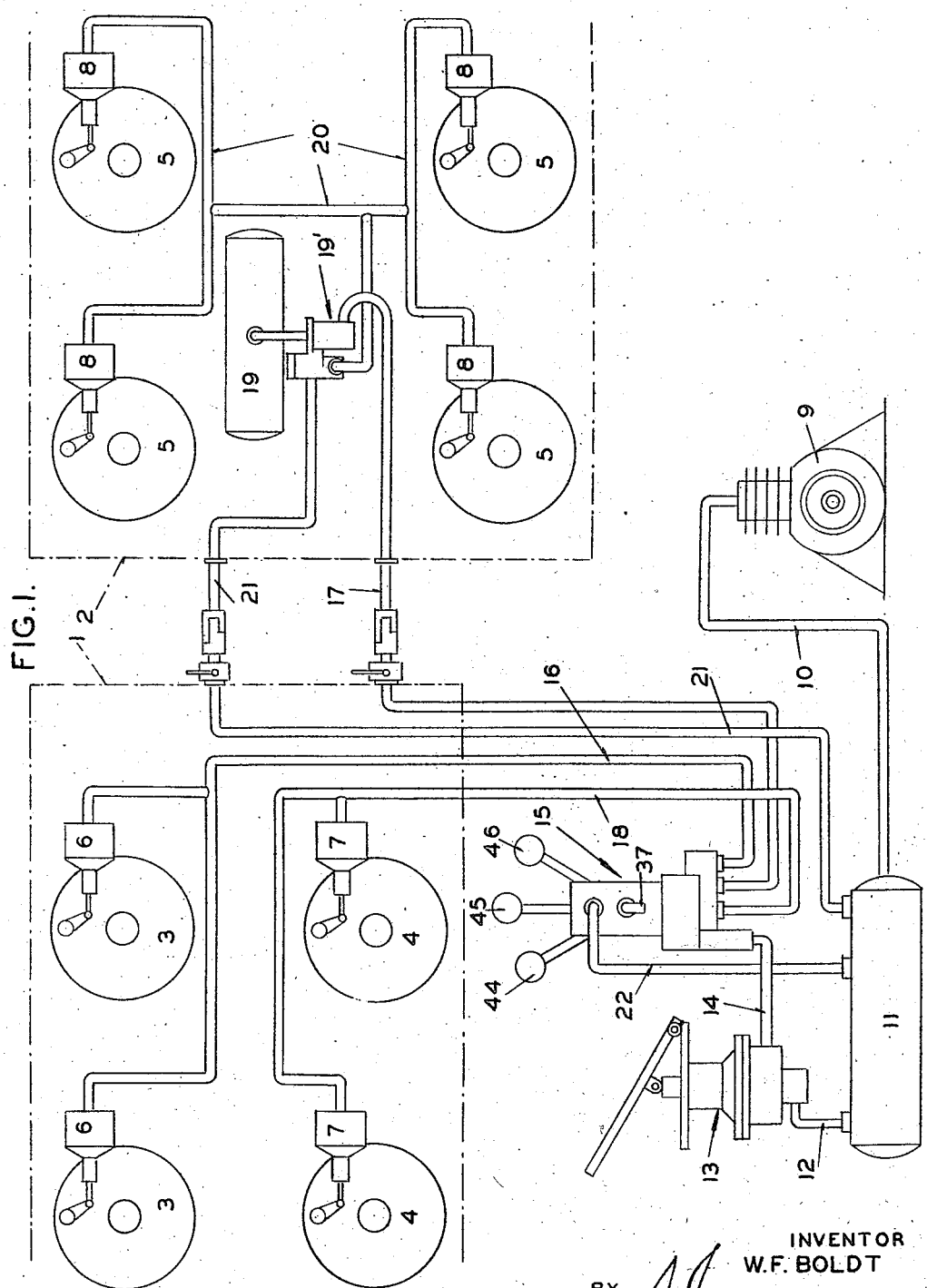
Figure 2:
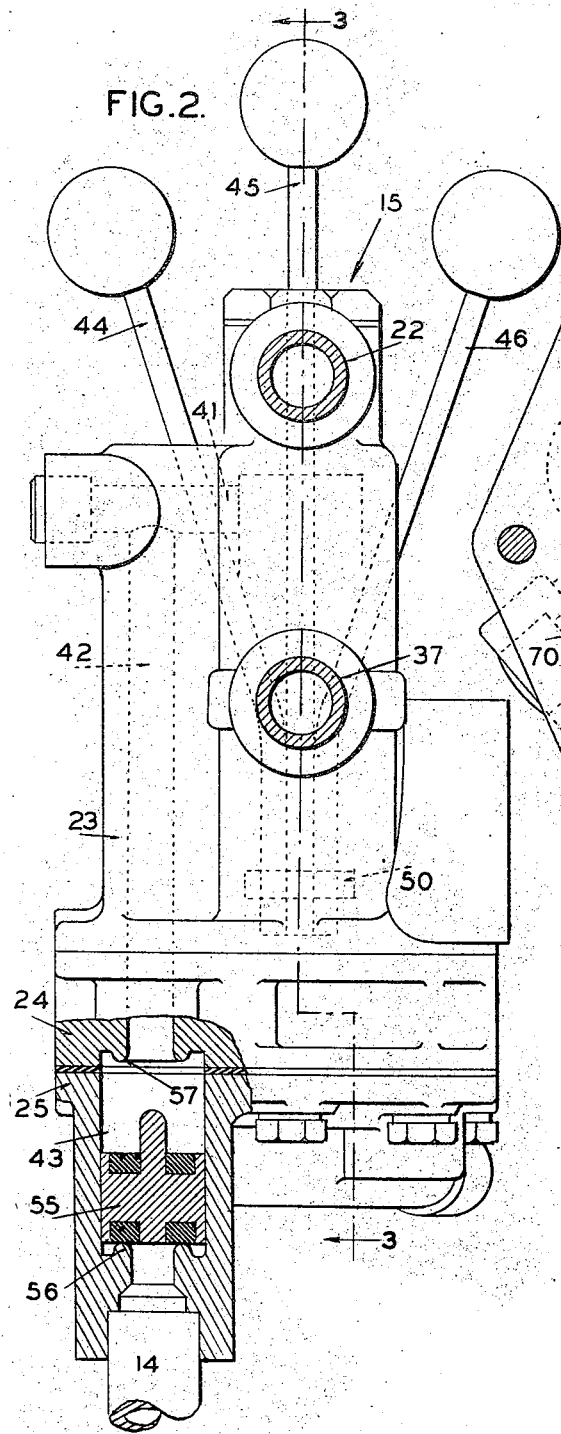
Figure 5:
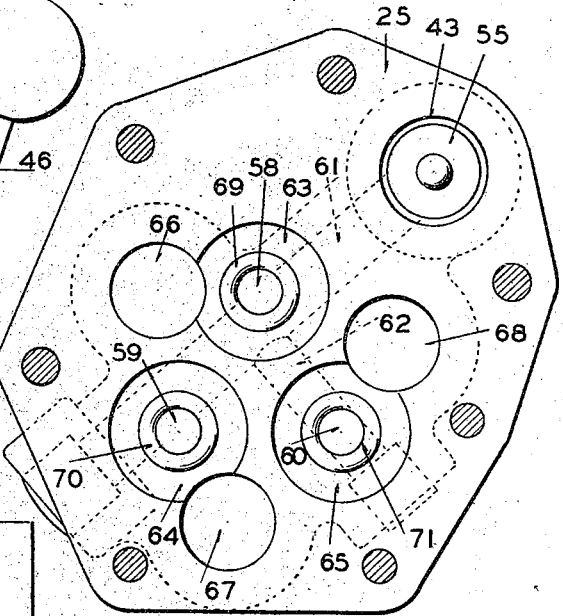

Other objects of my invention will become apparent from the following description taken in connection with the accompanying drawings in which Figure 1 is a schematic view of a braking system embodying my invention; Figure 2 is a partial sectional view of my novel control valve means embodied in the system whereby certain brakes can be selectively applied, said view being taken as seen by the operator; Figure 3 is a longitudinal sectional view of said valve taken on the line 3—3 of Figure 2; Figure 4 is a bottom view of said control valve; and Figures 5, 6, and 7, are sectional views of the control valve taken on the lines 5—5, 6—6, and 7—7, respectively, of Figure 3.

Referring to the drawings in detail and first to the schematic view of Figure 1, numeral 1 indicates a tractor vehicle and 2 a trailer vehicle. The tractor vehicle is provided with brakes 3 for the wheels on the right side and brakes 4 for the wheels on the left side, and the trailer is provided with brakes 5 for the wheels thereof. The brakes 3 are actuated by fluid motors 6, the brakes 4 by fluid motors 7, and the brakes 5 by fluid motors 8.

On the tractor vehicle there is provided a compressor 9 which is driven from any suitable source, as, for example, the engine for driving the tractor. This compressor has its outlet connected by means of a conduit 10 to a main storage tank 11 also mounted on the tractor. Connected to the storage tank is a conduit 12 which leads to a foot-operated control valve 13 of well-known construction, said valve being positioned in a convenient place in the operator's compartment of the tractor. A conduit 14 connects the foot valve to a hand-controlled valve means generally indicated by numeral 15 and from which conduits 16, 17, and 18 extend, conduit 16 being connected to fluid motors 6 of the right wheel brakes 3 and conduit 18 being connected to the fluid motors 7 of the left wheel brakes 4. The other conduit 17 extends to the tractor vehicle for applying the brakes 5 thereof, the trailer brake applying means comprising an auxiliary storage tank 19, a combined emergency and relay valve assembly 19' and conduits 20 leading to the fluid motors 8. The trailer braking system is also connected directly to the storage tank 11 on the tractor by means of a conduit 21, said conduit being employed to supply fluid to the auxiliary reservoir through the valve assembly 19' in a well-known manner. On the tractor vehicle there is also provided a conduit 22 which connects the hand-controlled valve means 15 with the storage tank 11 independently of conduits 12 and 14 and the foot-controlled valve 13.

The construction of the hand-controlled valve means 15 is such such that either the right or the left hand wheel brakes of the tractor may be selectively applied or only the trailer brakes applied. The control valve means 15 also embodies means whereby when the foot valve 13 is operated, conduits 16, 17 and 18 will all be placed in communication with conduit 14 leading from the foot valve, thus permitting all the brakes on both the tractor and trailer to be operated when the foot valve is operated. Since the novel features of my invention all flow from the particular hand-controlled valve means 15 and the manner in which it is associated with the braking system, details thereof will now be described, said details being shown in Figures 2, 3, 4, 5, 6 and 7.

The casing in which the control valve means is mounted comprises an upper section 23, a central section 24, and a bottom section 25, said sections being connected together by bolts in a suitable manner. The upper section 23 of the casing is provided with an inlet chamber 26 to which is connected the previously referred to conduit 22 coming from the main storage tank 11. This chamber communicates by a passage 27 with the upper end of a bore 28 and controlling the passage is an inlet valve 29 positioned in chamber 26. The inlet valve has a stem 30 extending into bore 28 and carried by the end of this stem is an exhaust valve element 31. A weak spring 32 cooperates with the valve stem to bias the inlet valve 29 to a seated position.

Also positioned within bore 28 is a piston 33 having a skirt 34 for receiving and guiding the exhaust valve element 31. The piston is provided with a passage 35 which is controlled by the exhaust valve element which, when unseated, places the upper end of bore 28 in communication with the atmosphere through an exhaust port 36 and a short conduit 37.

Mounted in bore 28 below piston 33 is a plunger 38 which in its normally inoperative position abuts against the central casing section 24. Between this plunger and the piston is a relatively strong metering spring 39 which is in a non-compressed condition when plunger 38 is in its lowermost position. A spring 40 acts upon piston 33 and biases it into engagement with the end of spring 39. This spring is employed to insure that the piston will assume its inoperative position when plunger 38 is in its normally inoperative position where the exhaust passage 35 is open. The bore 28 above the piston is provided with an outlet port 41 which connects with a passage 42 extending downwardly through the upper casing section 23 and the central section 24 where it communicates with the upper end of a bore 43 in the lower section member 25.

It is seen that by means of the valve structure mounted in the upper section 23, when all the parts are in their inoperative positions as shown in Figure 3, the inlet valve element 29 will be seated to cut off communication between the storage tank 11 and the upper end of bore 28 and said bore will be in communication with the atmosphere because of the unseated condition of the exhaust valve element 31. It is also apparent that when the plunger 38 is moved upwardly, piston 33 will be moved by means of spring 39, thus seating the exhaust valve element and then subsequently unseating the inlet valve element 29 to place the upper end of bore 28 and passage 42 in communication with the storage tank. When the fluid under pressure entering the upper end of bore 28 and the passage 42 reaches such a value that it can force piston 33 downwardly by compressing the spring 39, the inlet valve 29 will be closed and the exhaust valve element 34 will remain closed. Thus it is seen that there is provided a well-known metering type of valve wherein the source of pressure will be automatically cut off when it reaches a predetermined value as determined by the amount of movement of the actuating plunger 38 and the compression of spring 39.

The plunger 38 is adapted to be actuated by any one of the three levers 44, 45, and 46 which extend upwardly along side the upper section 23 of the casing. These levers are of general L-shape and the ends of their lower arms 47, 48 and 49 are pivotally connected to plunger 38 by a pin 50. The lower ends of these levers are also provided with fulcrum knobs 51, 52, and 53 whereby the levers can freely fulcrum upon a plate 54 to be presently described. Thus by moving any of the levers in the direction indicated by the arrow in Figure 3 the metering valve actuated by plunger 38 can be controlled.

The lower end of the previously mentioned bore 43 in the lower section 25 has connected thereto conduit 14 leading from the foot valve 13 and slidably mounted in the bore is a piston valve 55 for cooperation with a valve seat 56 at the bottom of the bore and a valve seat at the top of the bore. When this piston valve engages the valve seat 56, communication is prevented from the bore to conduit 14 and when it engages valve seat 57, communication is prevented from the bore to passage 42.

Also provided in the lower casing section 25 are three vertically positioned bores 58, 59 and 60 which are connected by a horizontal conduit 61 and a branch conduit 62 with the central part of bore 43. This bore is of such length as compared with the piston valve 55 that when said piston valve is in its lower position, passage 42 will communicate with the three vertical bores and when it is in its upper position, conduit 14 will communicate with the three vertical bores.

The upper ends of the vertical bores 58, 59 and 60 communicate with chambers 63, 64 and 65, respectively. The chamber 63 has a downwardly extending outlet port 66 to which the previously mentioned conduit 17 is connected, said conduit leading to the trailer brakes. The chamber 64 has a downwardly extending outlet port 67 to which is connected conduit 18 leading to fluid motors 7 of the left wheel brakes on the tractor. Chamber 65 also has a downwardly extending outlet port 68 to which is connected conduit 16 leading to the right wheel brakes of the tractor. The upper ends of the vertical bores 58, 59 and 60 have associated therewith valve seats 69, 70 and 71 for cooperation with suitable shut-off valves to thereby close the bores under certain conditions.

In the central casing section 24 there are three bores 72, 73 and 74 which are axially aligned with bores 58, 59 and 60, respectively. The bore 72 has reciprocably mounted therein a piston valve 75 and there is also mounted in bores 73 and 74 like piston valves 76 and 77. The lower ends of these pistons 75, 76 and 77 are adapted to cooperate with the valve seats 69, 70 and 71 to thus shut off the bores 58, 59 and 60. The piston valves 75, 76 and 77 are provided with stems 78, 79 and 80 which extend through openings in the upper ends of bores 72, 73 and 74, respectively, and engage the under side of plate 54 (previously referred to) mounted in the upper section 23. The piston valves 75, 76 and 77 have their upper faces cooperating with valve seats surrounding the holes through which the stems extend so that these pistons, when in their upper positions, will seal said holes. The bores within which the piston valves are positioned have their axes so positioned that the stems are at the apexes of an equilateral triangle.

The plate 54 is normally held upwardly at its center by a spring 81 against shoulders 82. This spring is of such strength as to also support levers 44, 45 and 46 which, as previously noted, have fulcrum knobs resting upon the top of plate 54. These fulcrum knobs 51, 52 and 53 are also so arranged that they are at the apexes of an equilateral triangle but the points at which they engage the plate are so related to the points at which the stems 78, 79 and 80 engage the bottom surface of the plate that a fulcrum knob will be between each two stems and outside the straight line drawn between the two stems. Thus it is seen that if a lever such as lever 46 is moved in the direction of the arrow in Figure 3, the fulcrum knob 53 thereon will so bear on the top of plate 54 that the two piston valves 78 and 79 will be pushed downwardly in order to close bores 58 and 59 but the piston valve 74 will not have pressure applied thereto. Also, if lever 44 is moved in the direction of the arrow, the fulcrum knob 51, when acting on plate 54, will cause piston valves 75 and 77 to be moved downwardly but piston valve 76 will not have pressure applied thereto. When lever 45 is moved, fulcrum knob 52 will so move the plate that the piston valves 76 and 77 will be moved downwardly but the piston valve 75 will not have pressure applied thereto. It is also apparent that each lever, when moved, will cause the closing of two of the three vertical bores and consequently will prevent passage of fluid through said bores to their connected conduits.

Referring to the operation, the parts of the hand-controlled valve means 15 will be as shown in Figures 2 to 7 when said valve means is inoperative. Under these conditions it is to be noted that the inlet valve 29 is closed and the conduits leading to all the brakes are in communication with bore 43. If it should be desired to apply the trailer brakes only, all that need be done is to move the central lever 45. As the lever is moved in the direction of the arrow, the fulcrum knob 52 thereof will press downwardly on the plate 54 and thus cause piston valves 76 and 77 to be pushed downwardly to close off bores 59 and 60. This will cut off communication with conduits 16 and 18 leading to the tractor brakes, leaving only conduit 17 leading to the trailer brakes in communication with bore 43. As lever 45 continues to be moved farther, the inlet valve 29 will be opened and fluid under pressure will be admitted from the tank on the tractor to the upper end of bore 43 and from there to the control valve on the trailer, thereby causing operation of the trailer brakes. If piston valve 55 in bore 43 should be in its upper position, it will be forced to the position shown in Figure 2 by the fluid under pressure entering bore 43. The inlet valve 26 will be automatically closed when the pressure admitted reaches such a value that piston 33 of the metering valve moves downwardly. Release of lever 45 will result in the trailer brakes being released by the exhausting of fluid to the atmosphere by way of passage 35 in the piston, port 36, and conduit 37.

If it should be desired to apply the right hand brakes of the tractor only, then the right hand lever 46 of the control valve means 15 is moved in the direction of the arrow in Figure 3. This will so move the plate 54 that conduits 17 and 18 will be cut off from communication with bore 43 and the source of pressure leaving only conduit 16 communicating with said bore. Additional movement of lever 46 will close the exhaust port 35 and open the inlet valve 29 to admit fluid under pressure to fluid motors 6 for actuating the brakes of the right wheels of the tractor. The brakes will be released when the lever is released.

If it is desired to apply only the left hand brakes of the tractor, the left hand lever 44 is moved in the direction of the arrow in Figure 3. This will so move plate 54 that conduits 16 and 17 will be cut off from communication with the upper end of bore 43 leaving only conduit 18 in communication with said bore. Continued movement of the lever will close the exhaust passage 35 and open the inlet valve 29 to admit fluid under pressure to fluid motors 7 to apply the brakes on the left wheels of the tractor. The brakes will be released when lever 44 is released.

It is thus seen that by means of the control valve means 15 the operator can apply either the right or the left wheel brakes only of the tractor or the trailer brakes only depending upon which he desires. By being able to apply either the right or the left hand brakes only on the tractor, he can thus use these brakes to aid in steering the tractor vehicle. Also, at times when he desires only the trailer brakes to be applied, this can be done by the operation of the central lever 45 of the control valve means 15.

When it is desired to apply all the brakes on both the tractor and trailer, the foot valve 13 is operated. When fluid pressure is admitted through conduit 14 to the lower end of bore 43, piston valve 55 will be moved upwardly, thereby preventing fluid from entering passage 42 and at the same time connecting all the conduits 16, 17, and 18 with the lower ends of bore 43 and conduit 14. Thus fluid under pressure will be admitted to the fluid motors 4 and 6 of the tractor brakes and the combined emergency and relay valve means 19' on the trailer will be so operated that the trailer brakes will be applied. If piston valves 75, 76, and 77 should be in their lower seated positions because of the action of gravity, they will be unseated by the incoming fluid and be maintained in this position as long as fluid pressure is being admitted by the foot control valve. Release of the foot control valve will release all the brakes by exhausting fluid through the usual exhaust port of said foot control valve.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure actuating system, valve means for selectively controlling the flow of fluid under pressure from the source of pressure to two devices to be actuated, said valve means comprising a main control valve means having inlet and exhaust valve elements for controlling fluid pressure from the source and exhausting it from the devices, a shut-off valve for preventing flow of fluid to each device, two levers each of which is connected to operate the main control valve, and means for manually closing one shut-off valve by one lever when the inlet and exhaust valve elements of the main valve means is operated thereby and for manually closing the other shut-off valve by the other lever when the inlet and exhaust valve elements of the main valve means is operated thereby.

2. In a fluid pressure actuating system, valve means for selectively controlling the flow of fluid under pressure from the source of pressure to two devices to be actuated, said valve means comprising a main control valve for controlling fluid pressure from the source, a shut-off valve for preventing flow of fluid to each device, two operating levers, means for connecting both levers to the main control valve, and means for connecting each lever to close a shut-off valve, the connection between each lever, the main control valve and a shut-off valve being such that the lever will first close the shut-off valve and then fulcrum on the connecting means to the shut-off valve to thereby permit subsequent operation of the main control valve.

3. In a fluid pressure actuating system, valve means for selectively controlling the flow of fluid under pressure from a source of pressure to three devices to be actuated, said valve means comprising a single main control valve for controlling fluid pressure from the source, a shut-off valve for preventing flow of fluid to each device, three members each of which is connected to operate the main control valve, means for manually causing the closing of two shut-off valves whenever a member is operated to control the main valve, the two shut-off valves closed being different for each member operated.

4. In a fluid pressure actuating system, valve means for selectively controlling the flow of fluid under pressure from a source of pressure to three devices to be actuated, said valve means comprising a single main control valve means having inlet and exhaust valve elements for controlling fluid pressure from the source and exhausting it from the devices, a shut-off valve for preventing flow of fluid to each device, three levers each of which is connected to operate the inlet and exhaust valve elements of the main control valve means, and means for manually causing the closing of two shut-off valves when the main valve is operated by a lever, the two shut-off valves closed being different for each lever operated.

5. In a fluid pressure actuating system, valve means for selectively controlling the flow of fluid under pressure from a source of pressure to three devices to be actuated, said valve means comprising a main control valve for controlling fluid pressure from the source, a shut-off valve for preventing flow of fluid to each device, said shut-off valves being provided with actuating parts positioned to form a triangle, a plate cooperating with the parts, and three members each of which is connected to operate the main control valve, said members being so associated with the plate that when each is operated the plate will be so tilted that two of the shut-off valves will be closed, the two shut-off valves closed by the operation of any one member being different than those closed by the operation of the other members.

6. In a fluid pressure actuating system, valve means for selectively controlling the flow of fluid under pressure from a source of pressure to three devices to be actuated, said valve means comprising a main control valve for controlling fluid pressure from the source, a shut-off valve for preventing flow of fluid to each device, said shut-off valves being provided with actuating parts positioned in the form of a triangle, a plate resting on said parts, and three levers each of which has a part connected to operate the main control valve and a part engaging the top surface of the plate each plate-engaging part being positioned between two valve actuating parts and outside a line drawn therebetween so that when the lever is operated the plate will be so tilted that two of the shut-off valves will be closed and the lever will fulcrum on the plate to subsequently operate the main control valve, the two shut-off valves closed by the operation of any one lever being different from those closed by the operation of the other levers.

7. In valve structure of the class described, single valve means for controlling the flow of fluid under pressure from a source, a conduit leading from the outlet of the valve means, three outlets communicating with the conduit, a shut-off valve for each outlet, three levers connected to the single valve means each of which is capable of controlling it, means for closing by manual effort two shut-off valves by each lever when it is actuated to control the single valve means, the two shut-off valves closed being different for each lever, and means for automatically placing said three outlets in communication with a source of fluid pressure independently of the conduit and the single valve means.

8. In valve structure of the class described, single valve means for controlling the flow of fluid under pressure from a source, a conduit leading from the outlet of the valve means, two outlets communicating with the conduit, a shut-off valve for each outlet, two members connected to the single valve means each of which is capable of controlling it, means for closing a shut-off valve by a member when it is actuated to control the single valve means, and means for automatically placing said two outlets in communication with a source of pressure independently of the conduit and the single valve means, said last named means comprising a second conduit and a single two-way valve means having an automatically-operated member for closing the first conduit and placing the second conduit in communication with the two outlets when fluid pressure is present in said second conduit.

9. In valve structure of the class described, single valve means for controlling the flow of fluid under pressure from a source, a conduit leading from the outlet of the valve means, two outlets communicating with the conduit, a shut-off valve for each outlet, manually-operated means for closing by manual effort one shut-off valve and for subsequently controlling the single valve means and other independent manually-operated means for closing by manual effort the other shut-off valve and for subsequently controlling said single valve means, and means for automatically placing said two outlets in communication with a source of pressure independently of the conduit and the single valve means and comprising a single pressure-operated valve element for shutting off the conduit.

10. In valve structure of the class described, a single metering valve means for controlling the flow of fluid under pressure from a source, a conduit leading from the outlet of the valve means, three outlets communicating with the conduit, a shut-off valve for each outlet, three manually operable members, means for manually closing a set of two shut-off valves by the operation of each manually operable member, each set of two shut-off valves being different from the other sets, and means for controlling the single metering valve by each manually operable member after it closes a set of two shut-off valves.

11. In valve structure of the class described, a single valve means for controlling the flow of fluid under pressure from a source, a conduit leading from the outlet of the valve means, three outlets communicating with the conduit, a normally open shut-off valve for each outlet, and a plurality of manually-operated means equal in number to said outlets individually selectively operable and engageable with means contactable with all of said valves constructed and arranged so that operation of each of said manually-operated means closes two of said valves and admits pressure fluid to the third outlet.

12. In valve structure of the class described, a single valve means for controlling the flow of fluid under pressure from a source, a conduit leading from the outlet of the valve means, three outlets communicating with the conduit, a normally open shut-off valve for each outlet, three manually operable means, each of said manually operable means engageable with an intermediate member, so constructed and arranged that operation of each of said manually operable means causes said intermediate member to engage a different two valves to close same, and means for automatically placing said three outlets in communication with a source of fluid pressure independently of the conduit and the single valve means.

WERNER F. BOLDT.